United States Patent
Yoshida et al.

(10) Patent No.: US 9,531,786 B2
(45) Date of Patent: Dec. 27, 2016

(54) DEVICE MANAGEMENT SYSTEM, DEVICE MANAGEMENT METHOD, AND STORAGE MEDIUM

(71) Applicant: KYOCERA Document Solutions Inc., Osaka-shi, Osaka (JP)

(72) Inventors: Daisuke Yoshida, Osaka (JP); Toyoaki Oku, Osaka (JP); Koki Nakajima, Osaka (JP); Takeshi Nakamura, Osaka (JP); Yoshihiko Arai, Osaka (JP); Atsushi Matsumoto, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 266 days.

(21) Appl. No.: 14/332,300

(22) Filed: Jul. 15, 2014

(65) Prior Publication Data
US 2015/0026585 A1    Jan. 22, 2015

(30) Foreign Application Priority Data
Jul. 18, 2013  (JP) .................................. 2013-149737

(51) Int. Cl.
*G06F 3/0481* (2013.01)
*H04L 29/08* (2006.01)

(52) U.S. Cl.
CPC .......... *H04L 67/025* (2013.01); *G06F 3/0481* (2013.01)

(58) Field of Classification Search
CPC ............................. G06F 3/0481; H04L 67/025
See application file for complete search history.

(56) References Cited

U.S. PATENT DOCUMENTS

| | | | |
|---|---|---|---|
| 6,101,608 A * | 8/2000 | Schmidt ................. | H04L 12/12 713/162 |
| 2006/0120616 A1* | 6/2006 | Kita .................... | H04N 1/00204 382/254 |
| 2009/0262122 A1* | 10/2009 | Darsa ...................... | G09G 5/14 345/545 |

FOREIGN PATENT DOCUMENTS

| CN | 1776571 A | 5/2006 |
|---|---|---|
| JP | 2002290595 A | 10/2002 |
| JP | 2006140898 A | 6/2006 |

* cited by examiner

*Primary Examiner* — Peiyong Weng
(74) *Attorney, Agent, or Firm* — Alleman Hall McCoy Russell & Tuttle LLP

(57) ABSTRACT

A device management system includes an electronic device and a remote maintenance server. The electronic device displays an operation screen to a user. The remote maintenance server includes a transparent panel management portion that draws a guide image on a virtual transparent panel based on an operation of a service person performed on a service terminal device, and causes the electronic device to overlay and display the virtual transparent panel on the operation screen.

12 Claims, 11 Drawing Sheets

F I G. 4
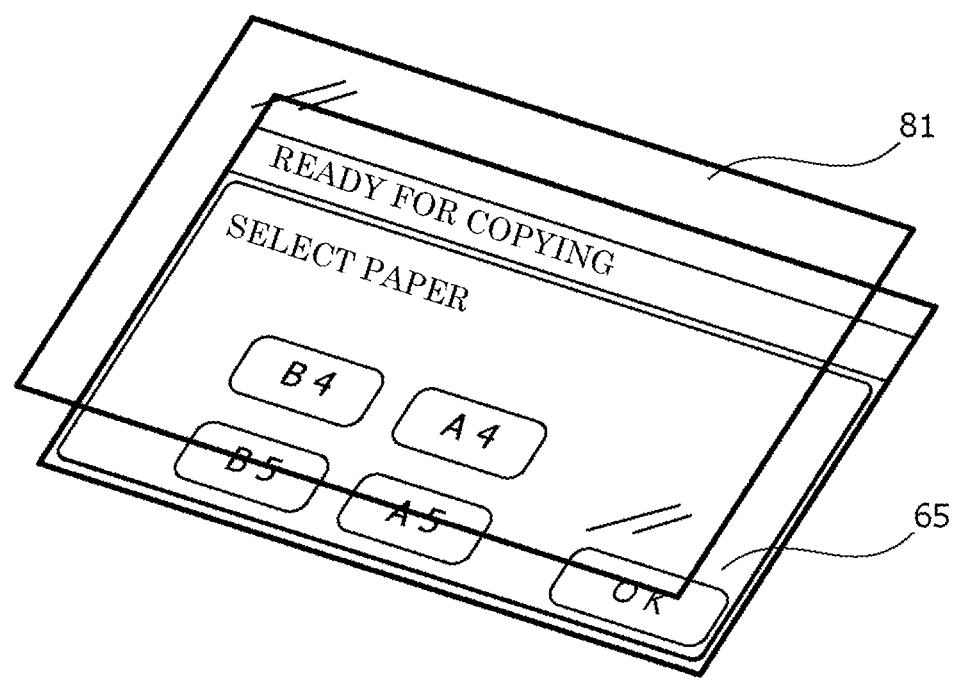

DEVICE MANAGEMENT SYSTEM, DEVICE MANAGEMENT METHOD, AND STORAGE MEDIUM

INCORPORATION BY REFERENCE

This application is based upon and claims the benefit of priority from the corresponding Japanese Patent Application No. 2013-149737 filed on Jul. 18, 2013, the entire contents of which are incorporated herein by reference.

BACKGROUND

The present disclosure relates to a device management system, a device management method, and a storage medium storing a device management program.

In one remote operation system, a browser of a remote terminal device or the like can be used to browse an operation screen of an image forming apparatus and instruct an operation.

In one device monitoring system, when an abnormality occurs in an electronic device, an monitoring device displays, on the operation panel of the electronic device, information of the progress of notification to the manager or the like.

SUMMARY

A device management system according to an aspect of the present disclosure includes an electronic device and a remote maintenance server. The electronic device includes an operation panel and displays an operation screen to a user. The remote maintenance server includes a transparent panel management portion that draws a guide image on a virtual transparent panel based on an operation of a service person performed on a service terminal device, and causes the electronic device to overlay and display the virtual transparent panel on the operation screen.

A device management method according to an aspect of the present disclosure includes: (i) displaying an operation screen to a user via an operation panel of an electronic device; and (ii) via a transparent panel management portion of a remote maintenance server, drawing a guide image on a virtual transparent panel based on an operation of a service person performed on a service terminal device, and causing the electronic device to overlay and display the virtual transparent panel on the operation screen.

A non-transitory storage medium according to a further aspect of the present disclosure stores a device management program that is executable by a computer in a remote maintenance server. The device management program includes a first program code and a second program code. The first program code causes the computer to draw a guide image on a virtual transparent panel, which is overlaid on an operation screen of an electronic device, based on an operation of a service person performed on a service terminal device. The second program code causes the computer to cause the electronic device to overlay and display the virtual transparent panel on the operation screen.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows the virtual transparent panel that is displayed overlaid on the operation screen of the image forming apparatus shown in FIG. 1.

DETAILED DESCRIPTION

The following describes an embodiment of the present disclosure with reference to the drawings.

Figure 1:
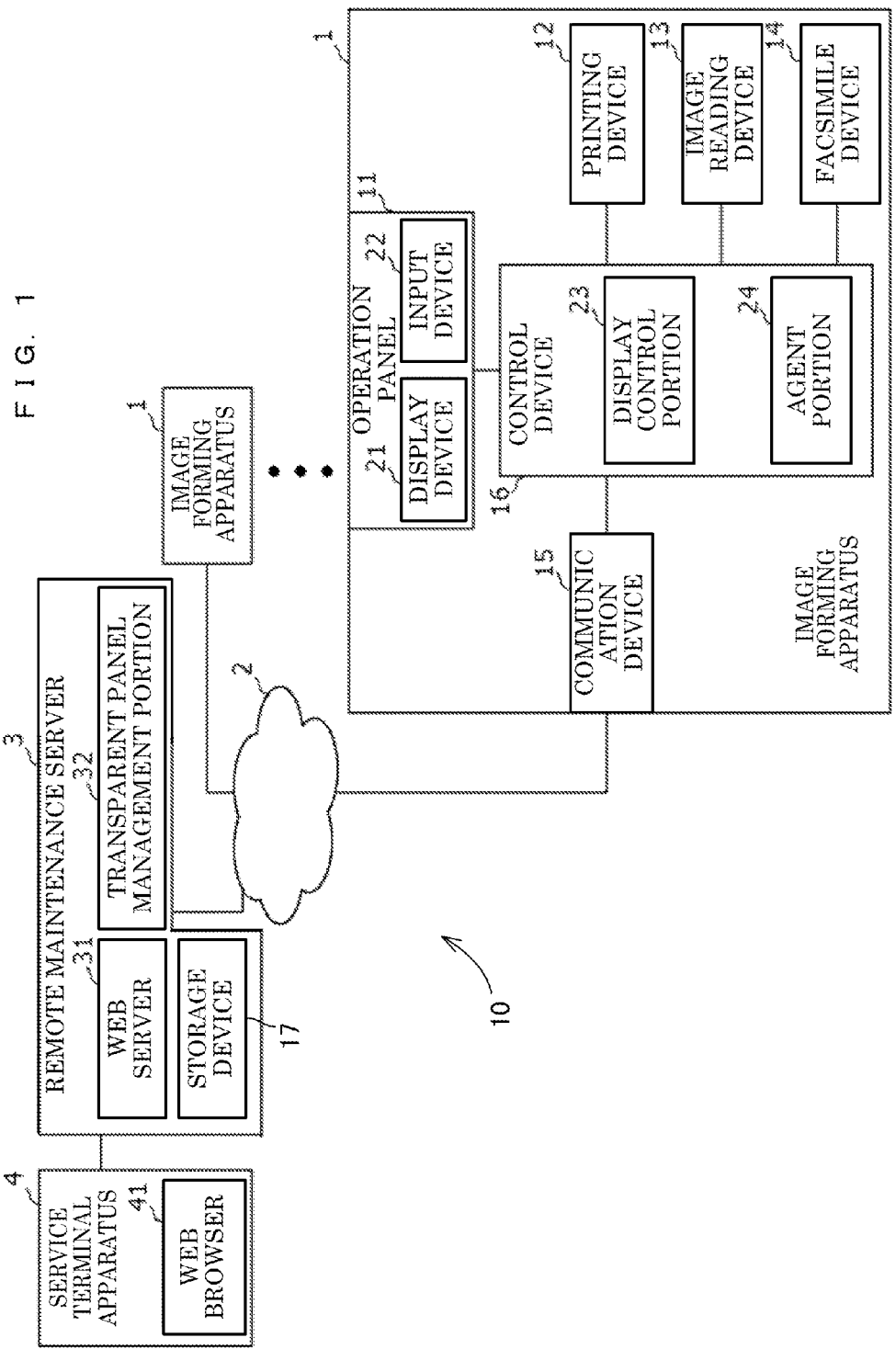
FIG. 1 shows the structure of a device management system in an embodiment of the present disclosure.

FIG. 1 is a block diagram showing the structure of a device management system 10 in an embodiment of the present disclosure.

In the device management system 10 shown in FIG. 1, an image forming apparatus 1 is provided on the client side of the maintenance service. The image forming apparatus 1 is connected to a network 2. A remote maintenance server 3 is provided on the provider side of the maintenance service. The remote maintenance server 3 transmits message data in remoteness to the image forming apparatus 1 via the network 2, thereby causing the image forming apparatus 1 to display a message corresponding to the message data. The message data is generated in a service terminal device 4 of the maintenance service provider side, sent from the service terminal device 4, and registered in the remote maintenance server 3. The registered message data is transmitted by the remote maintenance server 3 and is received by the image forming apparatus 1. That is, a service person of the maintenance service provider operating the service terminal device 4 specifies an image forming apparatus 1 on which a message is to be displayed, and inputs contents of the message. The service terminal device 4 is a personal computer or the like. The service terminal device 4 generates message data based on the operation of the service person, and outputs the message data to the remote maintenance server 3.

Furthermore, the remote maintenance server 3 draws a guide image on a virtual transparent panel 81 based on the operation of the service person performed on the service terminal device 4, and causes the image forming apparatus 1 to overlay and display the virtual transparent panel 81, which is described below, on an operation screen 65.

The image forming apparatus 1 is an electronic device including an operation panel 11 on which an operation screen 65 is displayed to a user. In the present embodiment, the image forming apparatus 1 is a multifunction peripheral.

The image forming apparatus 1 includes a printing device 12, an image reading device 13, a facsimile device 14, a communication device 15, a storage device 17 (storage medium), and a control device 16, as well as the operation panel 11.

The operation panel 11 is disposed on the upper surface side of a housing of the image forming apparatus 1. The operation panel 11 includes a display device 21 and an input device 22. The display device 21 displays a screen to the user. The input device 22 receives an operation from the user. The display device 21 is a liquid crystal display or the like. The input device 22 is composed of, for example, hard keys and a touch panel that realizes soft keys together with the display device 21.

The printing device 12 is an internal device that prints an image by, for example, the electrophotographic printing, based on the image data.

The image reading device 13 is an internal device that optically reads a document sheet image from a document sheet, and generates image data of the document sheet image.

The facsimile device 14 is an internal device that transmits facsimile signals of the document sheet image, and receives facsimile signals and generates image data of a document sheet image from the received facsimile signals.

The communication device 15 is an internal device that is connected to the network 2, and performs data communications with other devices (in the present embodiment, the remote maintenance server 3) connected to the network 2. A network interface, a modem or the like may be used as the communication device 15.

The control device 16 includes a computer, loads a program from a storage device or a recording medium that are not shown, causes the computer to execute the program to realize various processing portions. In the control device 16, a display control portion 23 and an agent portion 24 are realized as the processing portions.

The display control portion 23 controls screen display of the display device 21 of the operation panel 11.

Figure 2:
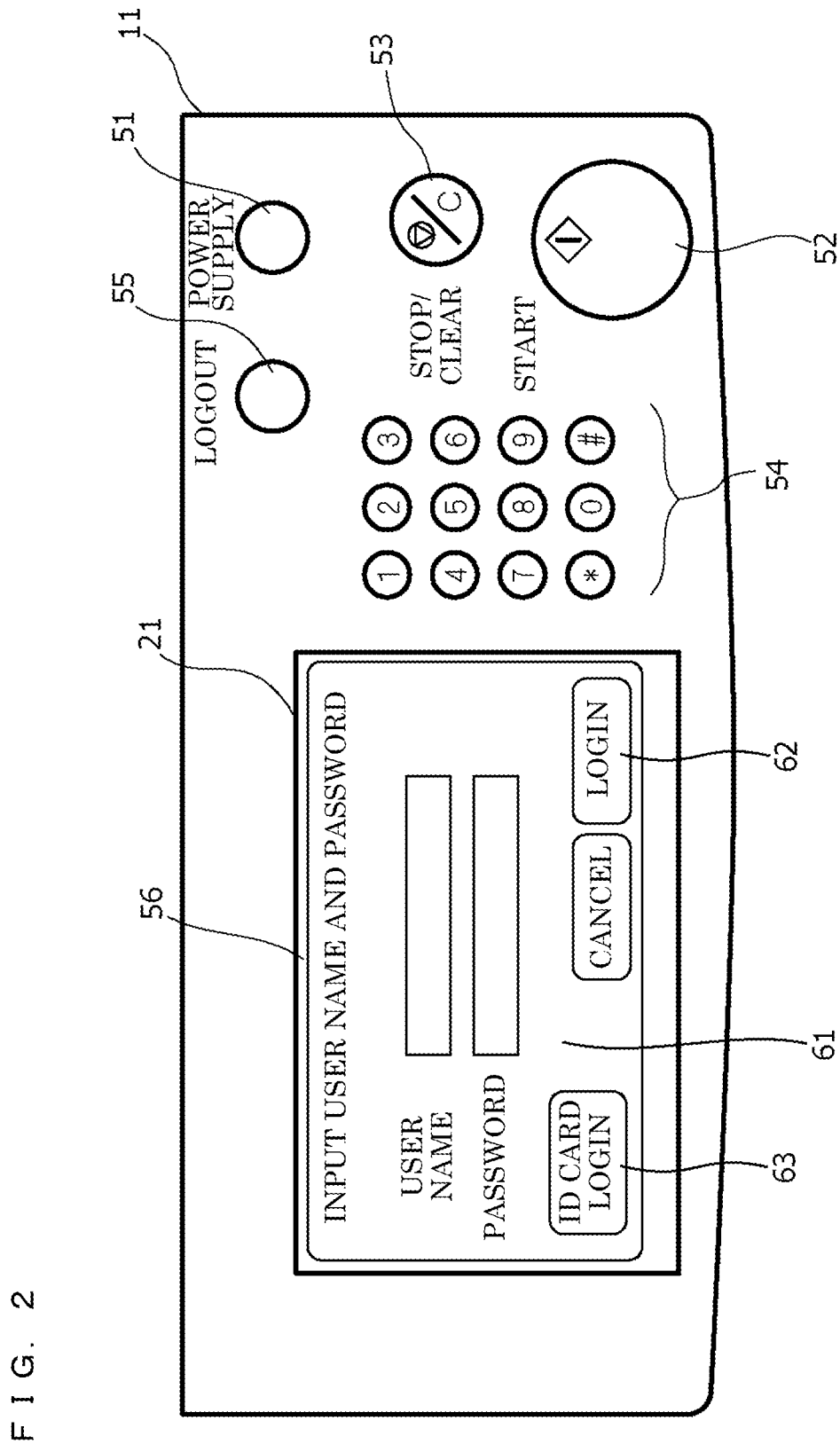
FIG. 2 shows an example of an operation panel of an image forming apparatus shown in FIG. 1.

FIG. 2 shows an example of the operation panel 11 of the image forming apparatus 1 shown in FIG. 1. The operation panel 11 shown in FIG. 2 includes, as the input device 22, hard keys 51-55 and a touch panel 56. The hard key 51 is a power supply key. The hard key 52 is a start key. The hard key 53 is a stop/clear key. The hard key 54 is a numeric keypad. The hard key 55 is a logout key. The touch panel 56 is disposed on the display surface of the display device 21.

In FIG. 2, a login screen 61 is displayed on the display device 21 of the operation panel 11. In the login screen 61, a login key 62, an ID card login key 63 and the like are displayed, as well as an input field in which a user ID (user name) and a password are to be input. The login key 62 is a key for executing a user authentication for login and releasing the display of the login screen 61. The ID card login key 63 is a key for executing login with the ID card.

It is noted that, for example, inputting the user ID and the password is performed with the numeric keypad (the hard key 54).

Figure 3:
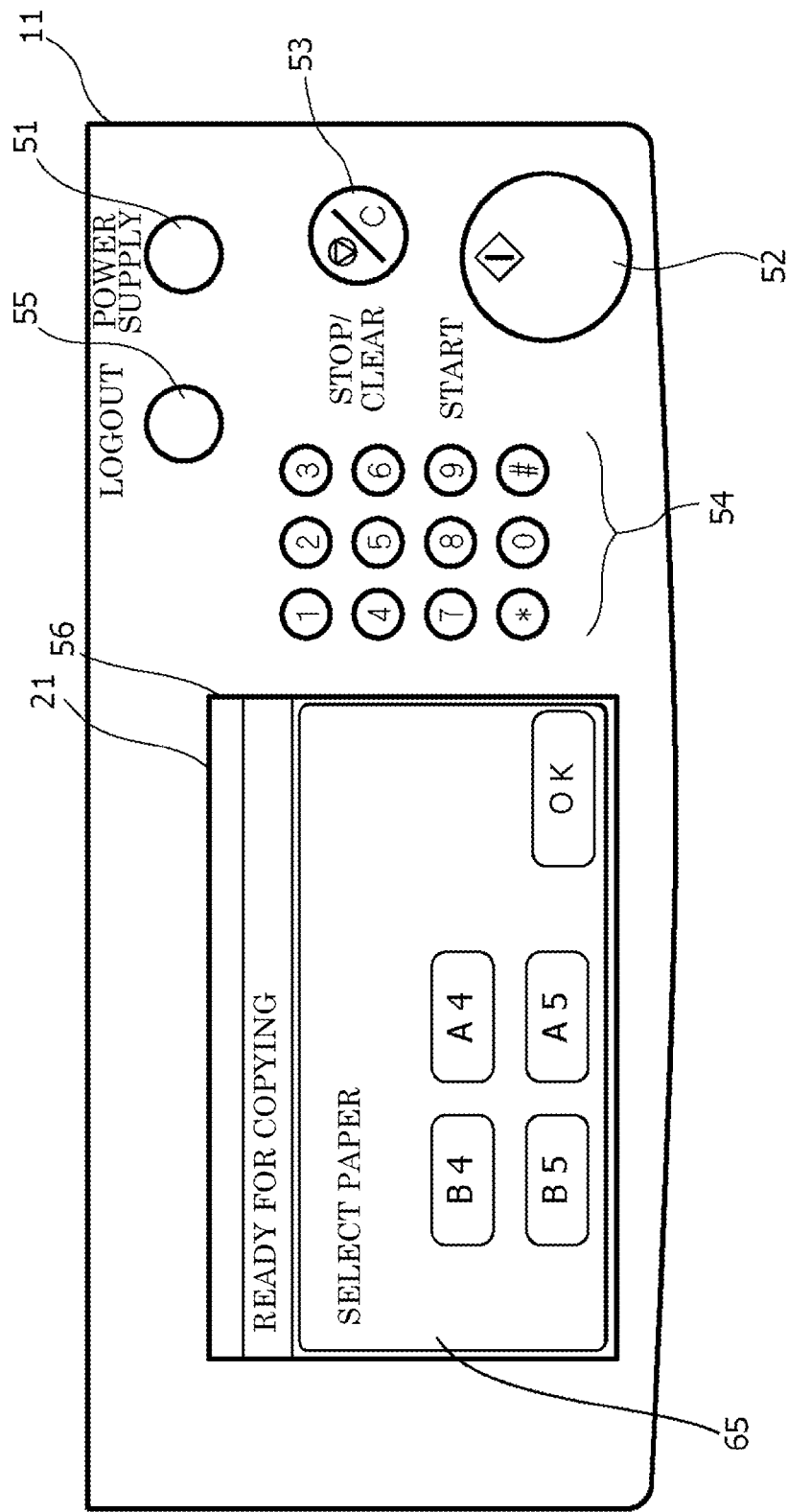
FIG. 3 shows an example of an operation screen displayed on the operation panel of the image forming apparatus shown in FIG. 1.

FIG. 3 shows an example of an operation screen displayed on the operation panel 11 of the image forming apparatus 1 shown in FIG. 1. In FIG. 3, an operation screen 65 is displayed on the display device 21 of the operation panel 11. It is noted that the operation screen 65 is a screen on which the user inputs settings to use a certain function of the image forming apparatus 1, and inputs an instruction to execute the processing of the function, and so on. The operation screen 65 shown in FIG. 3 is an operation screen for the copy function.

FIG. 4 shows the virtual transparent panel 81 that is displayed overlaid on the operation screen 65 of the image forming apparatus 1. As shown in FIG. 4, the virtual transparent panel 81 is an image of a transparent screen that is displayed as a layer upper than the image of the operation screen 65. Specifically, the virtual transparent panel 81 forms a layered structure together with the operation screen 65, and thereby can be virtually configured on the screen of the display apparatus 21. A guide image is displayed in the virtual transparent panel 81 as appropriate. As the guide image, an icon image indicating an operation position or the like in the operation screen 65, a text image describing an operation, a free-hand image that is a line drawing by a handwritten input of the service person, or the like may be used.

The agent portion 24 shown in FIG. 1, upon receiving image data of the virtual transparent panel 81 from the remote maintenance server 3 of the maintenance service provider side, instructs the display control portion 23 to display the virtual transparent panel 81 based on the image data. The display control portion 23 overlays and displays the virtual transparent panel 81 on the operation screen 65, based on the instruction to display virtual transparent panel 81.

On the other hand, the remote maintenance server 3 includes a web server 31, a transparent panel management portion 32, and a storage device 17. The service terminal device 4 includes a web browser 41.

The storage device 17 is a non-transitory internal memory storing a device management program. The device management program includes program codes (including the first to the seventh program codes) that correspond to the steps of the user support processing which is described below. The remote maintenance server 3 incorporates a computer, reads the device management program from the storage device 17 and executes the device management program, and operates as the web server 31 and the transparent panel management portion 32.

The web server 31 communicates with the web browser 41 of the service terminal device 4, and displays an operation screen 100 on the web browser 41 to the service person.

The transparent panel management portion 32 draws a guide image on the virtual transparent panel 81 based on an operation of the service person performed on the service terminal device 4. In addition, the transparent panel management portion 32, via the network 2, causes the image forming apparatus 1 to overlay and display the virtual transparent panel 81, on which the guide image has been drawn, on the operation screen 65.

In addition, the transparent panel management portion 32 obtains an image of the operation screen 65 from the image forming apparatus 1. In addition, the transparent panel management portion 32 uses the web server 31 to display the obtained image of the operation screen 65 on the web browser 41 of the service terminal device 4. Furthermore, the transparent panel management portion 32 obtains operation information of the operation performed by the service person to dispose the guide image on the image of the operation screen 65 displayed on the service terminal device 4. The transparent panel management portion 32 draws the guide image on the virtual transparent panel 81 based on the obtained operation information.

Furthermore, the transparent panel management portion 32 displays the guide image on the operation screen 65 displayed on the service terminal device 4, based on the obtained operation information.

Furthermore, the transparent panel management portion 32 locks the operation screen 65 of the image forming apparatus 1 before causing the image forming apparatus 1 to overlay and display the virtual transparent panel 81 on the operation screen 65.

Figure 5:
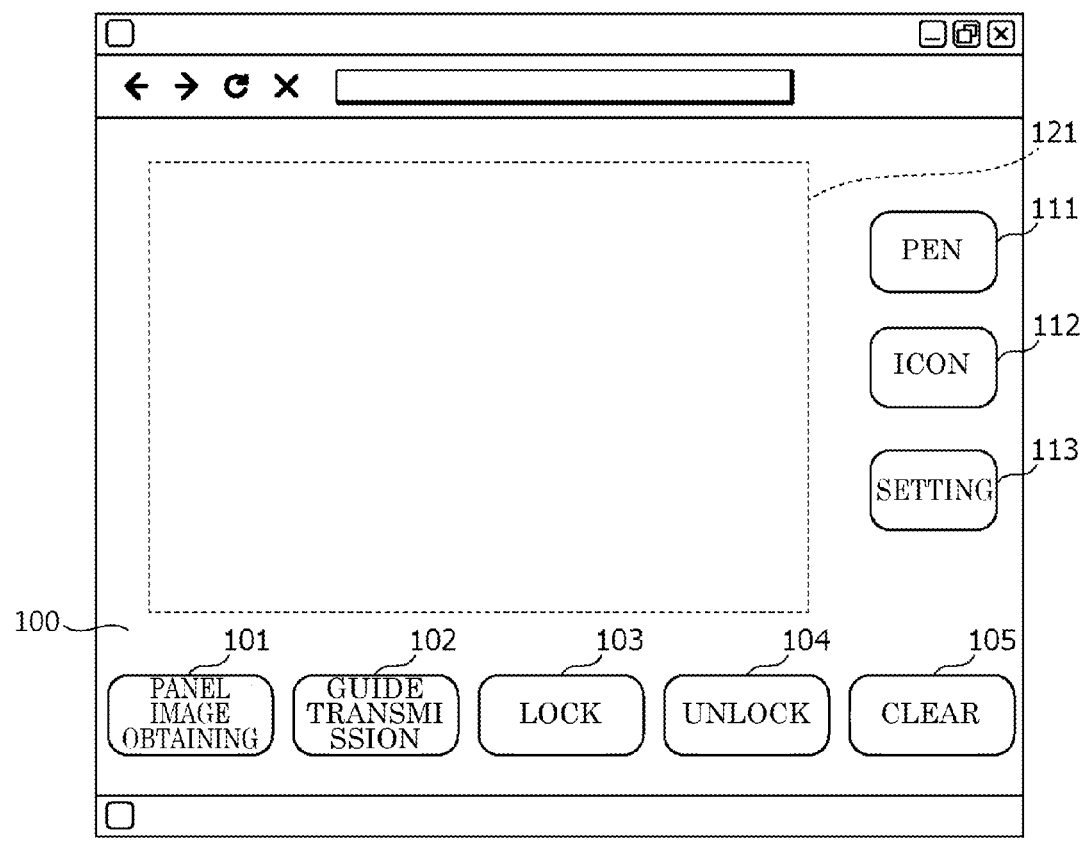
FIG. 5 shows an example of the operation screen for the service person, displayed on the web browser of the service terminal device shown in FIG. 1.

FIG. 5 shows an example of the operation screen for the service person, displayed on the web browser 41 of the service terminal device 4 shown in FIG. 1. The web browser 41 of the service terminal device 4 accesses a specific web page of the remote maintenance server 3, based on an operation of the service person. The web browser 41 then obtains web page data and displays an operation screen 100 shown in FIG. 5.

In the operation screen 100 shown in FIG. 5, a panel image obtaining key 101 is a soft key for outputting an instruction to obtain the image of the current operation screen 65 of the image forming apparatus 1.

A guide transmission key 102 is a soft key for outputting an instruction to draw a guide image, as has been set, on the virtual transparent panel 81 and overlay and display the virtual transparent panel 81 on the operation screen 65 of the image forming apparatus 1.

The lock key 103 is a soft key for outputting an instruction to lock the operation screen 65 of the image forming apparatus 1.

The unlock key 104 is a soft key for outputting an instruction to unlock the operation screen 65 of the image forming apparatus 1.

The clear key 105 is a soft key for outputting an instruction to end displaying the virtual transparent panel 81 in the image forming apparatus 1.

The pen key 111 is a soft key for displaying a pen cursor that is used by the service person to perform a handwritten input. The service person performs a handwritten input by operating the pen cursor with a mouse or the like that is not shown.

The icon key 112 is a soft key for displaying a list of icon images that are used by the service person to specify an operation position in the operation screen 65 or the like. The service person selects a desired icon image from the list and disposes the selected icon image on a desired position, with a mouse or the like that is not shown.

A setting key 113 is a soft key used by the service person to perform various types of settings.

A panel image display area 121 is an area for displaying an image of operation screen 65 obtained from the image forming apparatus 1.

It is noted that when the service person performs an operation on any of the keys 101-105 and 111-113, the web browser 41 transmits operation information of the operation to the web server 31 of the remote maintenance server 3. Upon receiving the operation information, the web server 31 outputs the operation information to the transparent panel management portion 32, and the transparent panel management portion 32 executes a process corresponding to the operation information.

Figure 6:
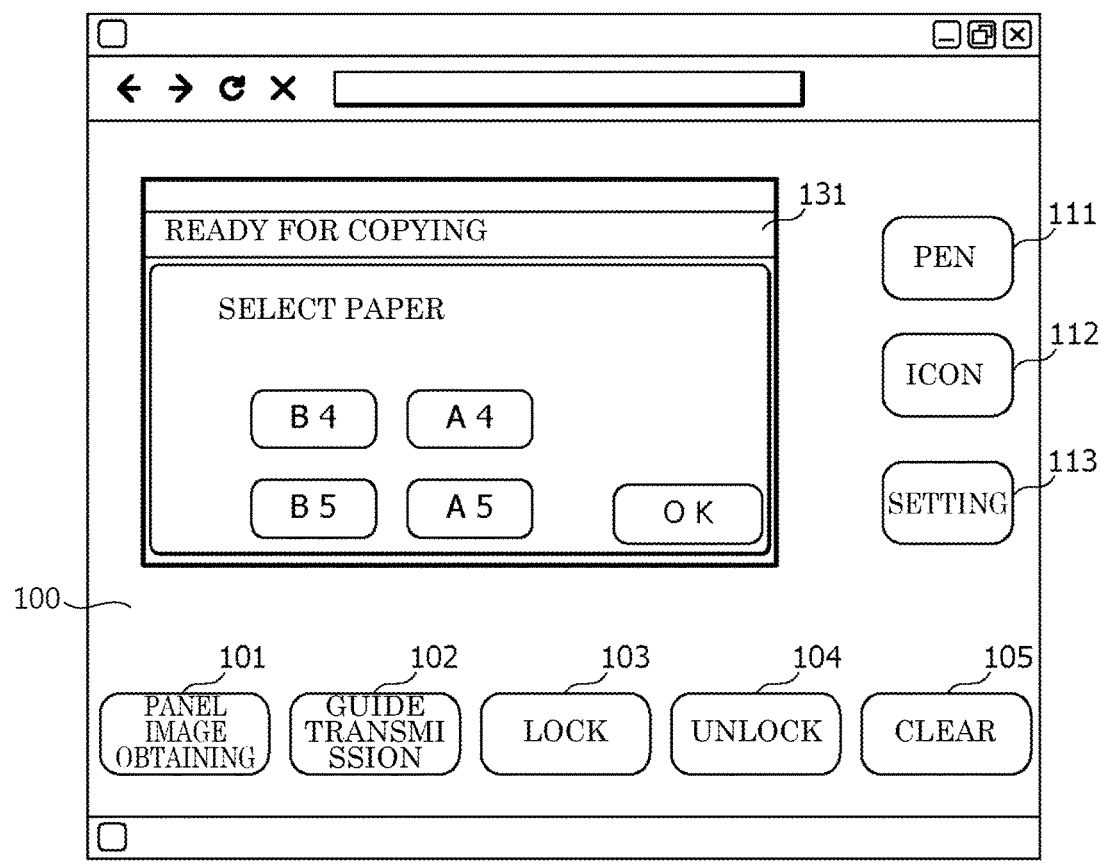
FIG. 6 shows a state where an image of the operation screen obtained from the image forming apparatus is displayed by the web browser shown in FIG. 5.

FIG. 6 shows a state where an image of the operation screen 65 obtained from the image forming apparatus 1 is displayed by the web browser 41 shown in FIG. 5. When the panel image obtaining key 101 is pressed in the state shown in FIG. 5, the transparent panel management portion 32 obtains an image of the operation screen 65 from the image forming apparatus 1 via the network 2. The transparent panel management portion 32 then, via the web server 31, displays an image 131 of the operation screen 65 on the web browser 41, as shown in FIG. 6.

Figure 7:
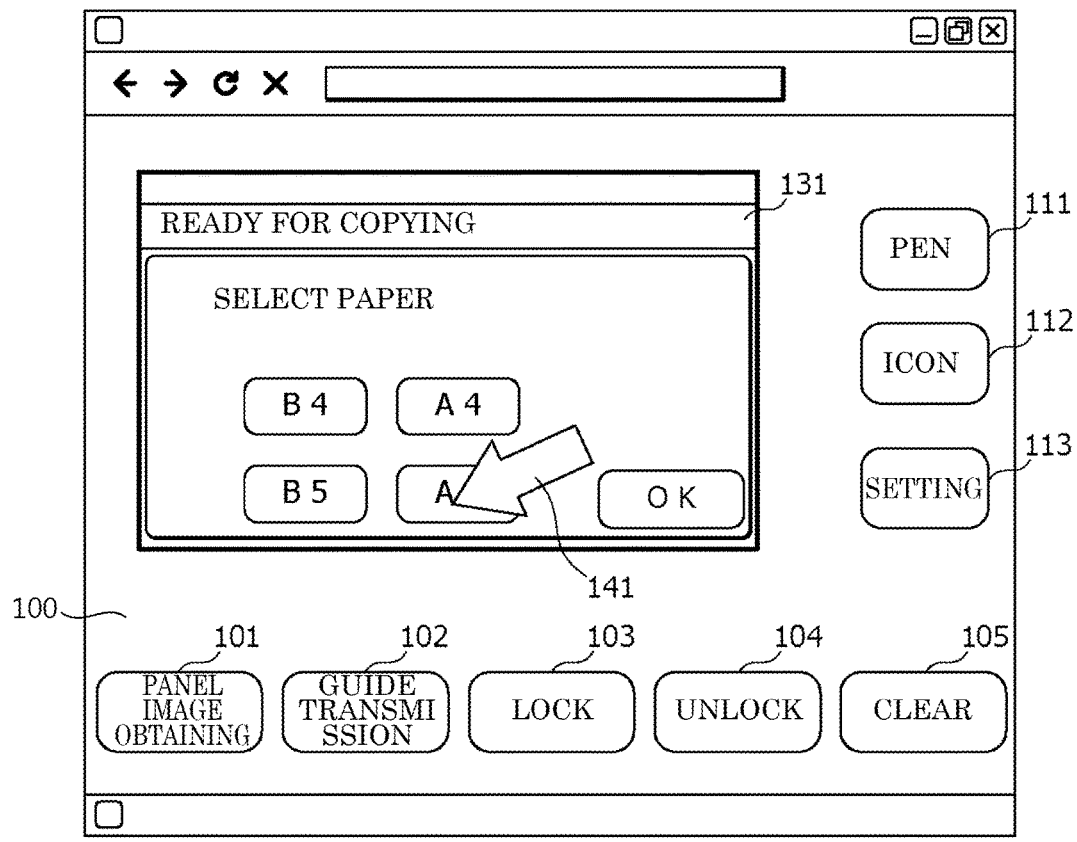
FIG. 7 shows a state where a guide image is displayed on the image of the operation screen by the web browser shown in FIG. 5.

FIG. 7 shows a state where a guide image is displayed on the image 131 of the operation screen 65 by the web browser 41 shown in FIG. 5. When, in the state shown in FIG. 6, the icon key 112 is pressed, and an arrow-shaped icon image is selected, and a display position of the icon image is specified, the transparent panel management portion 32, via the web server 31, displays an icon image 141 on the web browser 41, as shown in FIG. 7.

Figure 8:
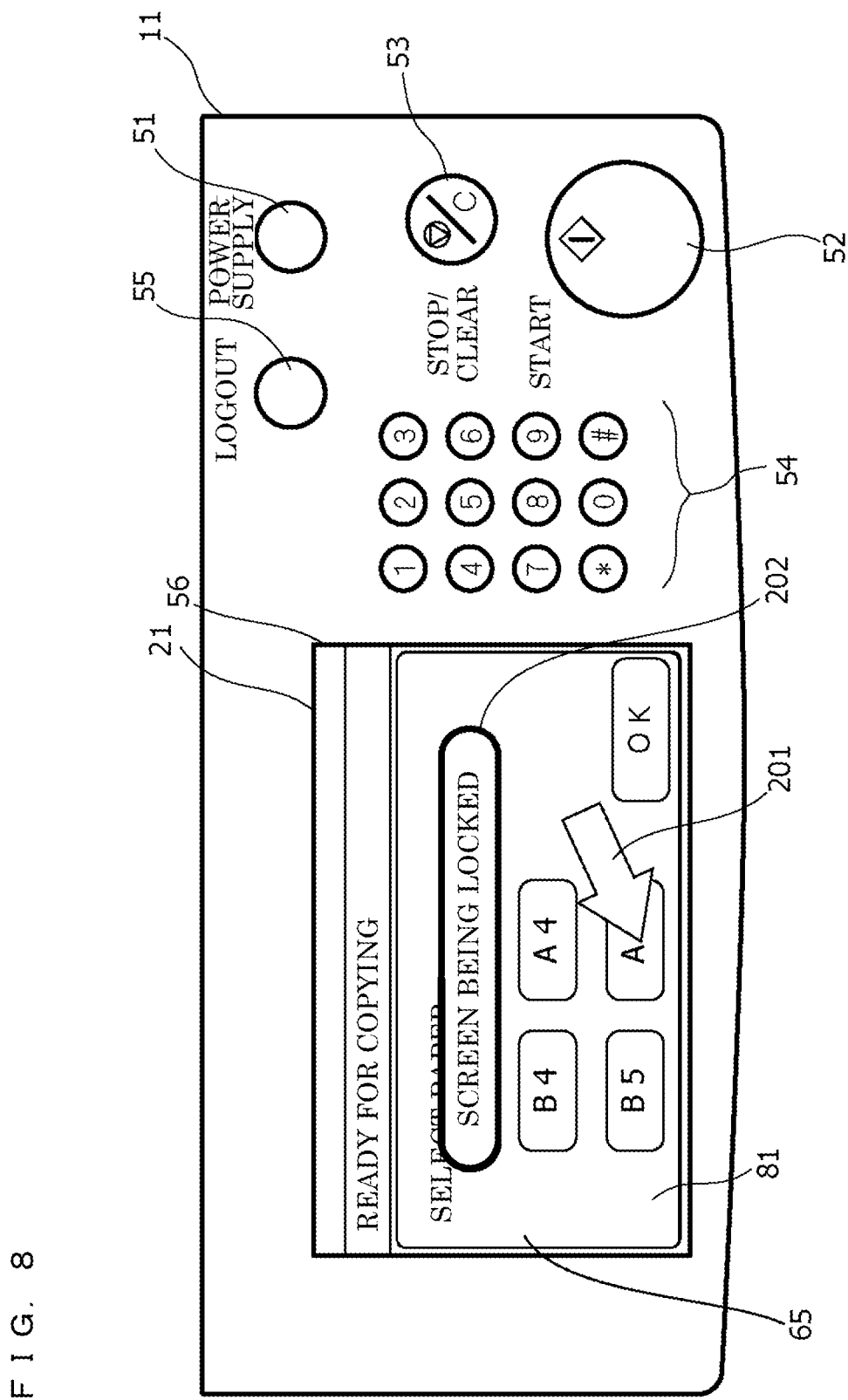
FIG. 8 shows a state where the virtual transparent panel including a guide image is displayed on the operation screen shown in FIG. 3.

FIG. 8 shows a state where the virtual transparent panel 81 including a guide image is displayed on the operation screen 65 shown in FIG. 3. When, in the state shown in FIG. 7, the lock key 103 is pressed and then the guide transmission key 102 is pressed, the transparent panel management portion 32, via the network 2, displays the virtual transparent panel 81 including a guide image 201 on the operation panel 11 of the image forming apparatus 1, as shown in FIG. 8. It is noted that when the lock key 103 has been pressed, the virtual transparent panel 81 also includes a lock notification image 202 notifying that the operation screen 65 is being locked.

Figure 9:
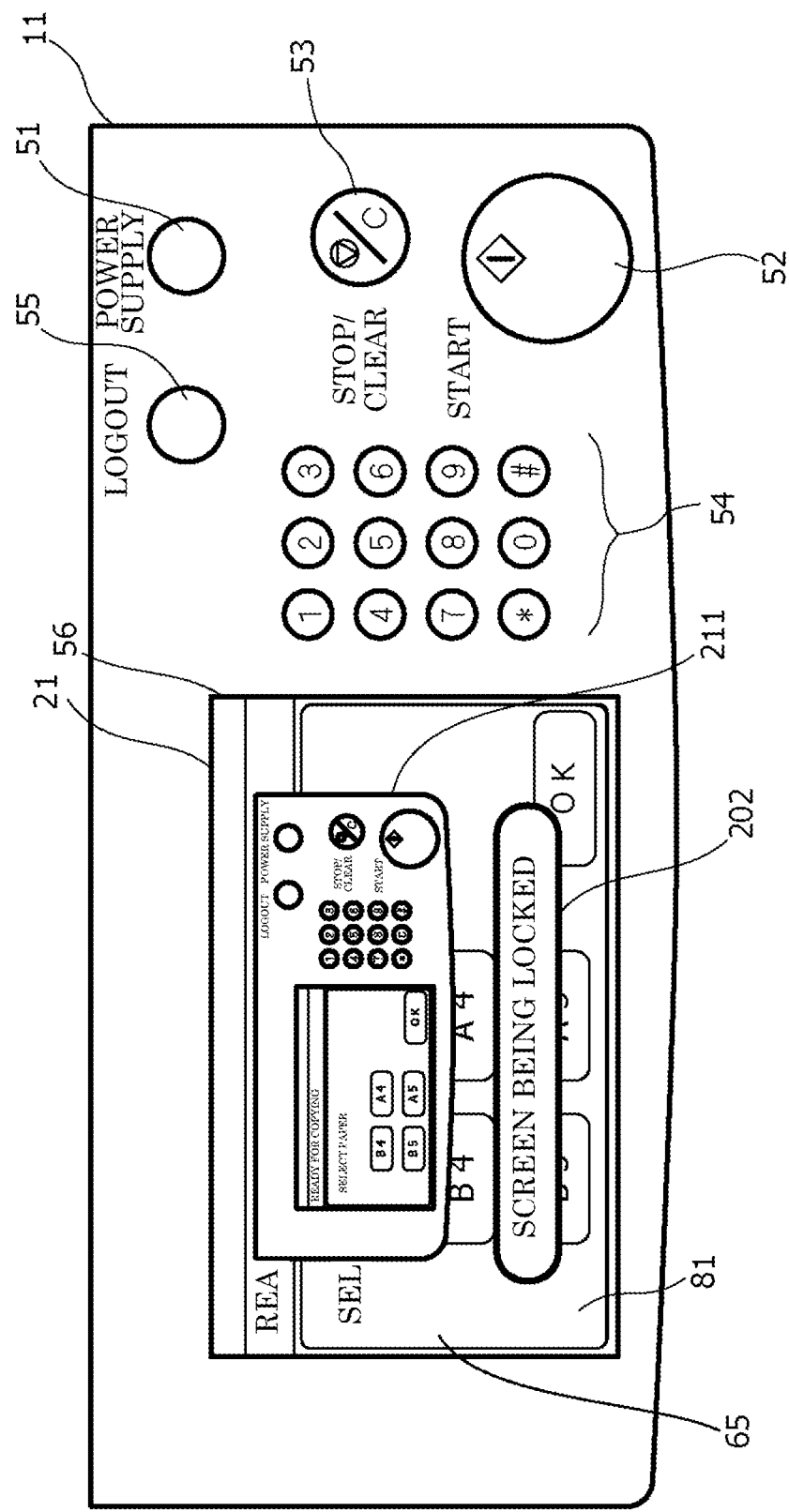
FIG. 9 shows an example of an image of the operation panel that is used as the guide image.

It is noted that a model image of the operation panel 11 may be used as the guide image. FIG. 9 shows an example of an image of the operation panel that is used as the guide image. As shown in FIG. 9, a model image 211 of the operation panel 11 is displayed as one of the icon images.

Figure 10:
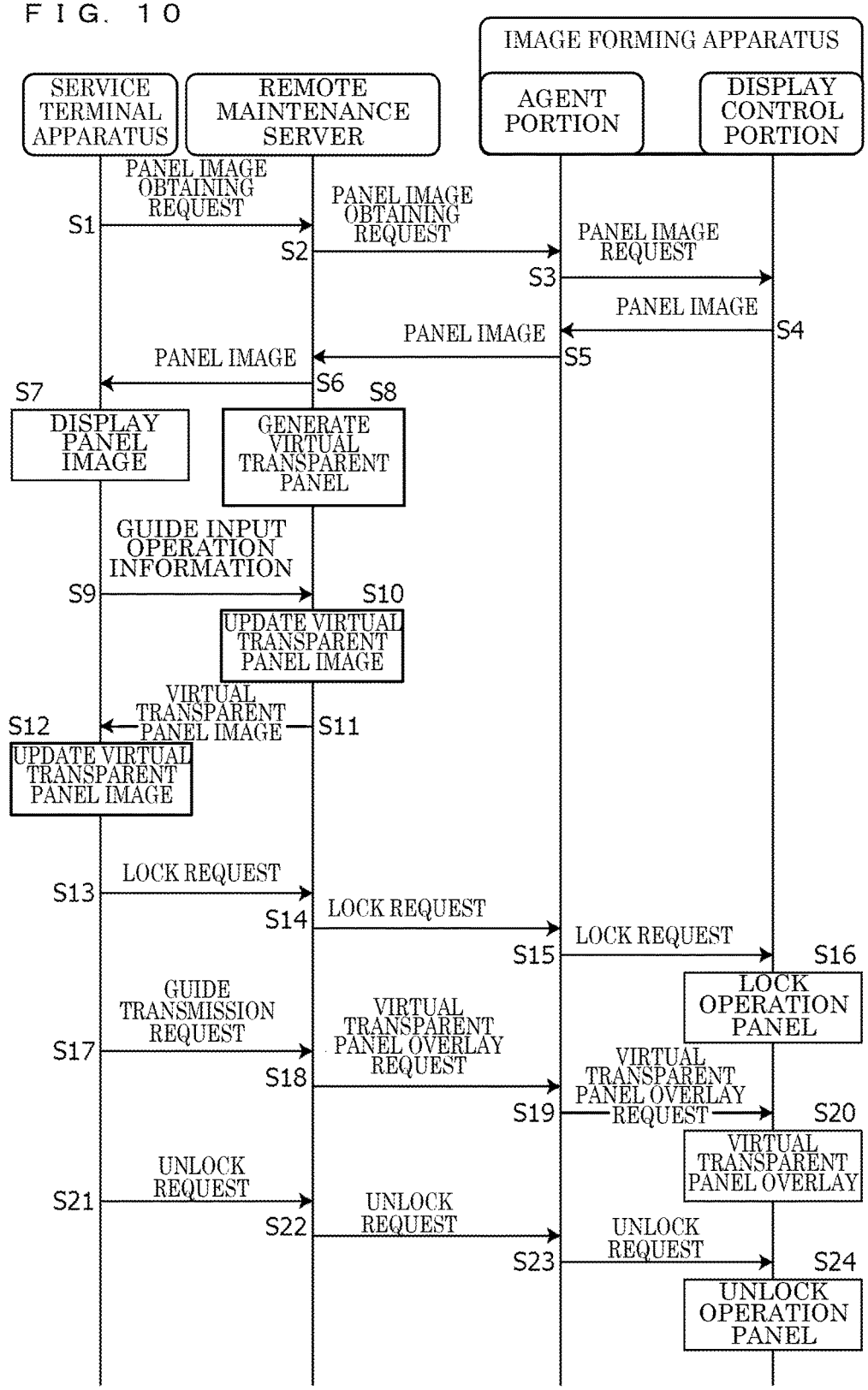
FIG. 10 shows steps of the user support processing performed in the device management system using the virtual transparent panel shown in FIG. 1.
Figure 11:
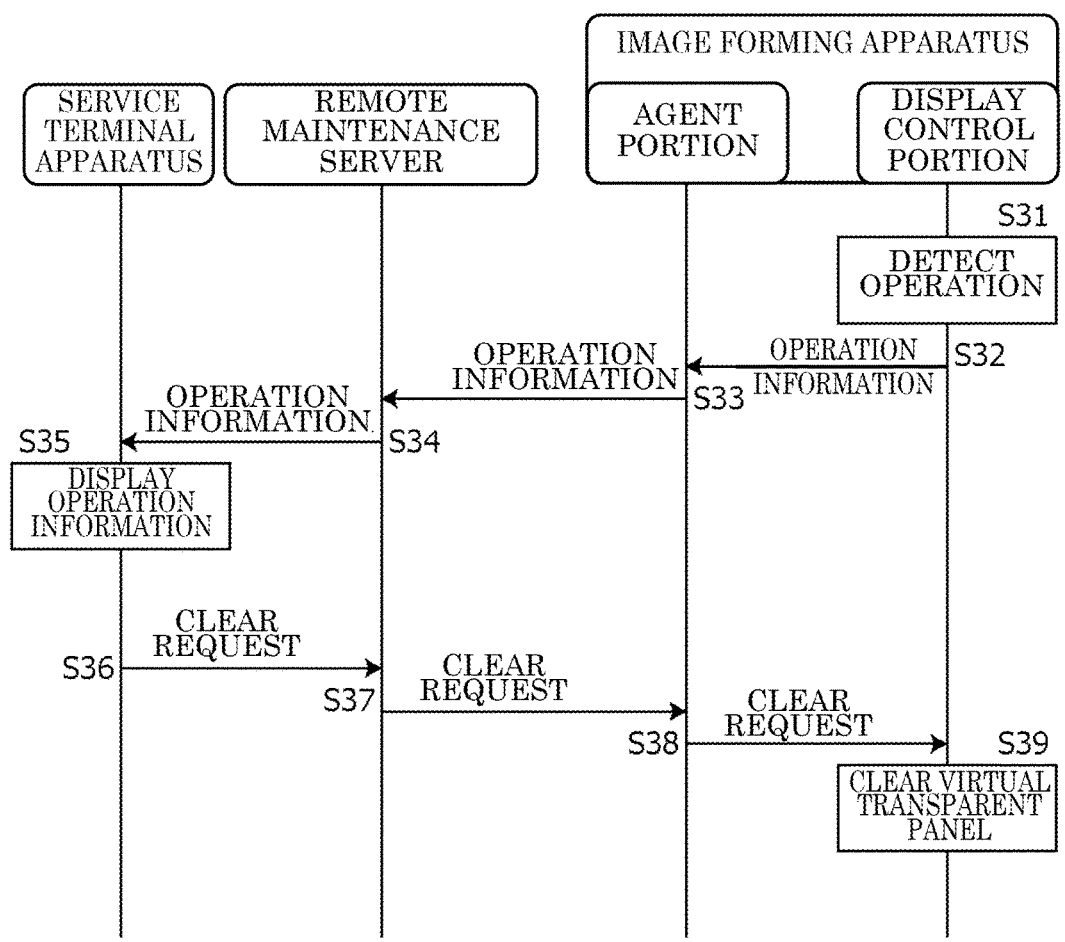
FIG. 11 shows steps of the user support processing performed in the device management system using the virtual transparent panel shown in FIG. 1.

Next, the user support processing performed in the device management system 10 using the virtual transparent panel 81 is described. FIGS. 10 and 11 show the steps of the user support processing performed in the device management system 10 shown in FIG. 1 using the virtual transparent panel 81.

First, a service person in a service center or the like operates the service terminal device 4 and displays the operation screen 100 shown in FIG. 5 on the web browser 41. When the service person presses the panel image obtaining key 101, the service terminal device 4 causes the web browser 41 to transmit, as a panel image obtaining request, the operation information of the panel image obtaining key 101 to the web server 31 of the remote maintenance server 3 (step S1).

Upon receiving the operation information transmitted from the web browser 41 via the web server 31, the transparent panel management portion 32 of the remote maintenance server 3 transmits the panel image obtaining request to the agent portion 24 of the image forming apparatus 1 via the network 2 (step S2).

Upon receiving the panel image obtaining request, the agent portion 24 requests the image of the current operation screen 65 displayed on the operation panel 11 from the display control portion 23 (step S3), and obtains the image from the display control portion 23 (step S4). Subsequently, the agent portion 24 transmits the image of the operation screen 65 to the transparent panel management portion 32 of the remote maintenance server 3 via the network 2 (step S5).

Upon receiving the image of the operation screen 65, the transparent panel management portion 32 of the remote maintenance server 3 displays the received image on the operation screen 100 of the service terminal device 4, as shown in FIG. 6 (steps S6 and S7), and generates a virtual transparent panel 81 (that is, initial image data of the virtual transparent panel 81) (step S8). At this time, the virtual transparent panel 81 does not include a guide image.

As shown in FIG. 6, on the operation screen 100 of the service terminal device 4, in the state where the image 131 of the operation screen 65 of the image forming apparatus 1 is displayed, the service person performs input operation for a guide image by operating the pen key 111, the icon key 112 or the like. In the service terminal device 4, the web browser 41 detects the operation information of the input operation, and transmits the operation information to the web server 31 (step S9).

In the remote maintenance server 3, the transparent panel management portion 32 receives the operation information transmitted from the web browser 41 via the web server 31, and updates the virtual transparent panel 81 by drawing a guide image corresponding to the received operation information on the virtual transparent panel 81 (step S10). The transparent panel management portion 32 causes the web server 31 to transmit an image of the updated virtual transparent panel 81 to the web browser 41 of the service terminal device 4 (step S11). Subsequently, the transparent panel management portion 32 displays the image of the updated virtual transparent panel 81 overlaid on the image 131 of the operation screen 65 of the image forming apparatus 1, on the operation screen 100 of the service terminal device 4 (step S12).

As described above, the service person, operating on the service terminal device 4, adds a guide image into the virtual transparent panel 81 for the operation screen 65 of the image forming apparatus 1, on the web browser 41 of the service terminal device 4.

Subsequently, the service person presses the lock key 103 to lock the operation screen 65 of the image forming apparatus 1 before displaying the virtual transparent panel 81 on the operation screen 65 of the image forming apparatus 1.

When the service person presses the lock key 103, the service terminal device 4 causes the web browser 41 to transmit, as a lock request, the operation information of the lock key 103 to the web server 31 of the remote maintenance server 3 (step S13). Upon receiving the operation information transmitted from the web browser 41 via the web server 31, the transparent panel management portion 32 of the remote maintenance server 3 transmits the lock request to the agent portion 24 of the image forming apparatus 1 via the network 2 (step S14). Upon receiving the lock request, the agent portion 24 requests the display control portion 23 to lock the operation screen 65 of the operation panel 11 (step S15), and the display control portion 23 locks the operation screen 65 of the operation panel 11 (step S16).

The service person presses the guide transmission key 102 to display the virtual transparent panel 81 on the operation screen 65 of the image forming apparatus 1.

When the service person presses the guide transmission key 102, the service terminal device 4 causes the web browser 41 to transmit, as the guide transmission request, the operation information of the guide transmission key 102 to the web server 31 of the remote maintenance server 3 (step S17). Upon receiving the operation information transmitted from the web browser 41 via the web server 31, the transparent panel management portion 32 of the remote maintenance server 3 transmits a virtual transparent panel overlay request and the image of the virtual transparent panel 81 to the agent portion 24 of the image forming apparatus 1 via the network 2 (step S18). Upon receiving the virtual transparent panel overlay request and the image of the virtual transparent panel 81, the agent portion 24 requests the display control portion 23 to overlay the virtual transparent panel 81 (step S19). The display control portion 23 overlays and displays the received image of the virtual transparent panel 81 on the current operation screen 65 on the operation panel 11, for example, as shown in FIG. 8 (step S20).

Subsequently, the service person performs a user support, such as an operation guide for the image forming apparatus 1, on the telephone or the like and updates the guide image included in the virtual transparent panel 81 by performing a similar operation, as necessary.

After the user support is completed, the service person presses the unlock key 104 to unlock the operation screen 65 of the image forming apparatus 1.

When the service person presses the unlock key 104, the service terminal device 4 causes the web browser 41 to transmit, as an unlock request, the operation information of the unlock key 104 to the web server 31 of the remote maintenance server 3 (step S21). Upon receiving the operation information transmitted from the web browser 41 via the web server 31, the transparent panel management portion 32 of the remote maintenance server 3 transmits the unlock request to the agent portion 24 of the image forming apparatus 1 via the network 2 (step S22). Upon receiving the unlock request, the agent portion 24 requests the display control portion 23 to unlock the operation screen 65 of the operation panel 11 (step S23), and the display control portion 23 unlocks the operation screen 65 of the operation panel 11 (step S24).

After the unlocking, the user can operate on the operation panel 11. When the display control portion 23 detects a user operation after the unlocking (step S31), the display control portion 23 transmits the operation information of the user operation to the transparent panel management portion 32 of the remote maintenance server 3 via the agent portion 24 (steps S32, S33). Upon receiving the operation information, the transparent panel management portion 32 of the remote maintenance server 3 notifies the web browser 41 and displays thereon that a user operation was performed after the unlocking (steps S34, S35).

Subsequently, the service person presses the clear key 105 to end displaying the virtual transparent panel 81 in the image forming apparatus 1.

When the service person presses the clear key 105, the service terminal device 4 causes the web browser 41 to transmit, as a clear request, the operation information of the clear key 105 to the web server 31 of the remote maintenance server 3 (step S36). Upon receiving the operation information transmitted from the web browser 41 via the web server 31, the transparent panel management portion 32 of the remote maintenance server 3 transmits the clear request to the agent portion 24 of the image forming apparatus 1 via the network 2 (step S37). Upon receiving the clear request, the agent portion 24 requests the display control portion 23 to end displaying the virtual transparent panel 81 that is being displayed on the operation screen 65 of the operation panel 11 (step S38). The display control portion 23 ends displaying the virtual transparent panel 81 (step S39).

In the case where a conventional remote operation system is applied, the web server 31 needs to be operated in the image forming apparatus 1, and at the same time, the image processing for instructing an operation (generating and displaying a guidance mark, or the like) on the operation screen 65 of the operation panel 11 needs to be performed in the image forming apparatus 1. To realize these, a dedicated platform needs to be implemented in each image forming apparatus 1, and this increases the cost.

According to the device management system 10 of the present embodiment, the remote maintenance server 3 draws a guide image on the virtual transparent panel 81 in remoteness based on the operation of the service person operating the service terminal device 4, and the image forming apparatus 1 is caused to overlay and display the virtual transparent panel 81 on the operation screen 65.

With this structure, the remote maintenance server 3 side performs the process of generating the virtual transparent panel 81 and the like. As a result, the process performed by the image forming apparatus 1 is reduced. In addition, it is possible to display a guide image on the virtual transparent panel 81 of the image forming apparatus 1 without implementing a dedicated platform. As a result, it is possible to cause the image forming apparatus 1 to display operation instructions in remoteness at a relatively low cost.

The present disclosure is not limited to the present embodiment, but may be varied and modified in various ways within the scope of the present disclosure.

For example, in the present embodiment, the service terminal device 4 may not transmit a lock request, but the agent portion 24 may automatically request locking at the timing when it receives the virtual transparent panel overlay request.

In addition, in the present embodiment, the service terminal device 4 may not transmit a clear request, but, during the unlocking, the agent portion 24 may automatically request ending displaying the virtual transparent panel 81.

The present disclosure is applicable to, for example, a device management system for managing a plurality of image forming apparatuses 1.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A device management system comprising:
an electronic device including an operation panel and displaying an operation screen to a user;
a service terminal device including a browser and configured to transmit a guide transmission request based on an operation of a service person, the guide transmission request requesting an input of a guide image; and
a remote maintenance server including a transparent panel management portion, wherein
the transparent panel management portion upon receiving the guide transmission request transmitted from the service terminal device,
updates a virtual transparent panel by drawing the guide image on the virtual transparent panel based on the guide transmission request,
transmits the updated virtual transparent panel to the service terminal device and causes the service terminal device to display the updated virtual transparent panel on the browser, and
transmits the updated virtual transparent panel to the electronic device and causes the electronic device to overlay and display the updated virtual transparent panel on the operation screen.

2. The device management system according to claim 1, wherein prior to the transparent panel management portion of the remote maintenance server updating the virtual transparent panel, the transparent panel management portion:
obtains an image of the operation screen from the electronic device, and
causes the service terminal device to display the image of the operation screen on the browser of the service terminal device, and
wherein subsequent to the remote maintenance server transmitting the updated virtual transparent panel to the service terminal device, the remote maintenance server:
causes the service terminal device to overlay and display the updated virtual transparent panel on the operation screen on the browser.

3. The device management system according to claim 2, wherein, prior to the remote maintenance server obtaining the image of the operation screen:
the service terminal device:
transmits a panel image obtaining request based on an operation of the service person, the panel image obtaining request requesting an obtainment of the image of the operation screen of the electronic device, and
the transparent panel management portion, upon receiving the panel image obtaining request:
obtains the image of the operation screen from the electronic device based on the panel image obtaining request,
transmits the image of the operation screen to the service terminal device, causes the service terminal device to display the image of the operation screen on the browser, and generates the virtual transparent panel.

4. The device management system according to claim 1, wherein
the transparent panel management portion locks the operation screen of the electronic device before causing the electronic device to overlay and display the virtual transparent panel on the operation screen.

5. A device management method comprising:
displaying an operation screen to a user via an operation panel of an electronic device; and
when a guide transmission request requesting an input of a guide image is transmitted to a remote maintenance server from a service terminal device based on an operation of a service person operating the service terminal device, updating, via a transparent panel management portion of the remote maintenance server, a virtual transparent panel by drawing the guide image on the virtual transparent panel based on the guide transmission request, transmitting the updated virtual transparent panel to the service terminal device and causing the service terminal device to display the updated virtual transparent panel on a browser of the service terminal device, and transmitting the updated virtual transparent panel to the electronic device and causing the electronic device to overlay and display the updated virtual transparent panel on the operation screen.

6. The device management method according to claim 5, further comprising:
via the transparent panel management portion, obtaining an image of the operation screen from the electronic device, causing the service terminal device to display the image of the operation screen on the browser of the service terminal device, and causing the service terminal device to overlay and display the updated virtual transparent panel on the operation screen on the browser.

7. The device management method according to claim 6, when a panel image obtaining request requesting an obtainment of an image of the operation screen of the electronic device is transmitted to the remote maintenance server from the service terminal device based on an operation of the service person, obtaining, via the transparent panel management portion, the image of the operation screen from the electronic device based on the panel image obtaining request, transmitting the image of the operation screen to the service terminal device, causing the service terminal device to display the image of the operation screen on the browser, and generating the virtual transparent panel.

8. The device management method according to claim 5, locking, via the transparent panel management portion, the operation screen of the electronic device before causing the electronic device to overlay and display the virtual transparent panel on the operation screen.

9. A non-transitory storage medium storing a device management program that is executable by a computer in a remote maintenance server, the device management program including:

a first program code that causes the computer to, when a guide transmission request requesting an input of a guide image is transmitted to the remote maintenance server from a service terminal device based on an operation of a service person operating the service terminal device, update a virtual transparent panel by drawing the guide image on the virtual transparent panel based on the guide transmission request; and a second program code that causes the computer to transmit the updated virtual transparent panel to the service terminal device and cause the service terminal device to display the updated virtual transparent panel on a browser of the service terminal device, and transmit the updated virtual transparent panel to the electronic device and cause the electronic device to overlay and display the updated virtual transparent panel on an operation screen.

10. The storage medium according to claim 9, wherein the device management program further includes:

a third program code that causes the computer to obtain an image of the operation screen from the electronic device;

a fourth program code that causes the computer to cause the service terminal device to display the image of the operation screen on the browser; and a fifth program code that causes the computer to overlay and display the updated virtual transparent panel on the operation screen on the browser.

11. The storage medium according to claim 10, wherein the device management program further includes:

a sixth program code that causes the computer to, when a panel image obtaining request requesting an obtainment of an image of the operation screen of the electronic device is transmitted to the remote maintenance server from the service terminal device based on an operation of the service person, obtain the image of the operation screen from the electronic device based on the panel image obtaining request, transmit the image of the operation screen to the service terminal device, cause the service terminal device to display the image of the operation screen on the browser, and generate the virtual transparent panel.

12. The storage medium according to claim 9, wherein the device management program further includes:

a seventh program code that causes the computer to lock the operation screen of the electronic device before causing the electronic device to overlay and display the virtual transparent panel on the operation screen.

* * * * *